US005502782A

United States Patent [19]
Smith

[11] Patent Number: 5,502,782
[45] Date of Patent: Mar. 26, 1996

[54] FOCUSED ACOUSTIC WAVE FIBER OPTIC REFLECTION MODULATOR

[75] Inventor: Ronald H. Smith, Chevy Chase, Md.

[73] Assignee: Optelecom, Inc., Gaithersburg, Md.

[21] Appl. No.: 370,245

[22] Filed: Jan. 9, 1995

[51] Int. Cl.$^6$ ............................................. G02F 1/335
[52] U.S. Cl. ...................... 385/7; 385/1; 385/4; 385/10
[58] Field of Search ............................ 385/7, 1, 4, 10, 385/27

[56] References Cited

U.S. PATENT DOCUMENTS

| | | | |
|---|---|---|---|
| 3,858,437 | 1/1975 | Jarzynski et al. | 73/67.5 |
| 4,068,191 | 1/1978 | Zemon et al. | 331/94.5 |
| 4,328,569 | 5/1982 | Troit et al. | 367/103 |
| 4,477,723 | 10/1984 | Carome et al. | 250/227 |
| 4,753,507 | 6/1988 | De Paula et al. | 350/96.15 |
| 4,793,676 | 12/1988 | Risk | 385/4 |
| 4,872,738 | 10/1989 | Risk et al. | 385/1 |
| 4,907,856 | 3/1990 | Hickernell | 350/96.29 |
| 4,991,923 | 2/1991 | Kino et al. | 350/96.15 |
| 4,996,692 | 2/1991 | Kabacoff | 372/26 |
| 5,002,349 | 3/1991 | Cheung et al. | 385/1 |
| 5,054,873 | 10/1991 | Davis et al. | 385/27 |
| 5,119,447 | 6/1992 | Trisno | 385/3 |
| 5,159,601 | 10/1992 | Huber | 372/6 |
| 5,191,586 | 3/1993 | Huber | 372/6 |
| 5,400,171 | 3/1995 | Song | 385/7 |

OTHER PUBLICATIONS

*High–Performance Optical Analog Link Using External Modulator* G. E. Betts et al., IEEE Photonics Technology Letters, vol. 1, No. 11, Nov. 1989, pp. 404–406.
*Growth of Bragg Gratings Produced By Continuous–Wave Ultraviolet Light In Optical Fiber* by H. Patrick & S. L. Gilbert Optics Letters, vol. 18, No. 18, Sep. 15, 1993.
*New Design Concept for a Narrowband Wavelength–Selective Optical Tap and Combiner,* Electronic Letters, vol. 23, pp. 668–669, by D. C. Johnson et al. Apr. 1987.

Primary Examiner—John D. Lee
Assistant Examiner—Phan T. H. Palmer
Attorney, Agent, or Firm—Kerkam, Stowell, Kondracki & Clarke

[57] ABSTRACT

An improved optical fiber modulator producing a focused acoustic wave propagating from an acoustic transducer surrounding an optical fiber having an in-fiber reflection grating changes the core refractive index in proportion to the induced strain at the core when the focused acoustic wave arrives at the optical fiber core, and focused acoustic waves can also modulate optical carrier phase in a length of optical fiber which may lie in an arm of an interferometer. In a preferred embodiment, the index change shifts the reflection spectrum of an in-fiber grating located in the portion of optical fiber core on which the focused acoustic wave is centered with the reflection spectrum shift producing a change in the grating reflectivity for a narrow bandwidth optical signal on a skirt of the grating spectrum. Electronic multiplexing means may be used to both transmit and receive signal information on a single optical carrier signal, and a plurality of acoustic wave modulators may be placed along a single optical fiber, simultaneously modulating a plurality of optical signals each having an optical frequency matched to one of the modulator gratings. Acoustic wave modulators may be tuned to a range of optical carrier frequencies using thermal or mechanical strain control, and a series of tuned modulators lined up along an optical fiber accessed through an optical circulator will reflect and modulate selected signals which are then forwarded back through the circulator onto a transmission line optical fiber.

36 Claims, 8 Drawing Sheets

FOCUSED ACOUSTIC WAVE FIBER OPTIC REFLECTION MODULATOR

BACKGROUND OF THE INVENTION

Optical fiber signal modulation may be achieved in a number of ways, including modulation of emitter drive electronics, phase modulation of an arm of an optical fiber interferometer and spoiling a waveguide to create modulated signal attenuation. The latter two approaches are called external modulators as distinct from modulators which vary the strength of a signal emitted from a source. In-fiber gratings have been used to reflect and transmit optical carrier signals in varying proportions. Mechanical strain and thermal expansion have been described as means of varying the proportions of reflected and transmitted light for narrow band optical carrier signals striking an in-fiber grating.

Piezoelectric acoustic transducer material has been applied as a buffer around optical fiber to induce strain in the fiber core, resulting in phase modulation of optical carrier signals guided by the fiber. In prior art, a piezoactive polymer jacket, approximately 120 μm thick was used to produce phase modulation in single mode optical fiber having 80 μm fused silica diameter. Phase modulator performance was demonstrated over a frequency range from 300 Hz to 2.6 MHz. This work was published in 1984: J. Jarzynski:, "Frequency response of a single-mode optical fiber phase modulator utilizing a piezoelectric plastic jacket," J. Appl. Phys, 55(9), 3243, (1984). In the prior art: 1) Determination of piezoelectric electromechanical conversion transducer shell thickness is not described as a trade off between maximum voltage (limited by the product of dielectric strength of the transducer material with shell thickness) against pulse spreading which reduces maximum frequency response of the transducer when shell thickness goes above one quarter of the transducer material acoustic wavelength at the maximum frequency, said maximum frequency being limited by the criterion that acoustic wavelength must be at least equal to the optical waveguide mode field diameter. 2) Acoustic impedance matching among electromechanical conversion transducer shell material, conductive inner and outer sleeve materials and optical waveguide material is not identified as a means of reducing unwanted reflections to the point where acoustic resonance and signal modulation interference from reflections are substantially eliminated. 3) Determination of the maximum attainable magnitude of focusing gain is not described as that obtained when the formula for focusing gain incorporating both square root of the ratio of transducer diameter to minimum acoustic wavelength (set equal to waveguide mode field diameter) and exponential decay of acoustic wave particle velocity with propagation through an absorbing medium has a maximum value versus the independent variable of transducer shell diameter. 4) Shifting the optical frequency spectrum of an in-fiber reflection grating is not described as a means of providing nearly 100% modulation depth of an optical signal at up to 0.5 GHz modulation frequency.

The invention relates to external modulation of optical fiber carrier signals using focused acoustic waves to modify the reflection spectrum of an in-fiber grating.

SUMMARY AND OBJECTS OF THE INVENTION

The invention provides a thin cylindrical shell of electromechancial acoustic transducer material which propagates a focused acoustic wave to the core of an optical fiber.

Optical path length change induced by acoustic waves in the invention is a function of the variables identified in Table 1.

TABLE 1

VARIABLES IN OPTICAL PATH LENGTH CHANGE FORMULA

| VARIABLE SYMBOL | VARIABLE NAME | DIMENSIONS | VALUE ASSUMED IN PERFORMANCE ESTIMATE EXAMPLE |
|---|---|---|---|
| $A_o$ | Peak piezoelectric transducer drive voltage | volts | 0.59 |
| $\omega_{max}$ | Maximum angular modulation frequency | 1/seconds | $3 \times 10^9$ |
| $\omega$ | Angular modulation frequency | 1/seconds | $1 \times 10^9 \leq \omega 3 \times 10^9$ |
| $d_{11}$ | Electromechanical conversion coefficient | meters/volt | $5.5 \times 10^{-10}$ |
| $T_{p/m}$ | Particle velocity transmission at piezo/metal boundary | dimensionless | 1.16 |
| $T_{m/s}$ | Particle velocity transmission at metal/fused silica boundary | dimensionsless | 1.0 |
| $D_p$ | Piezoelectric shell diameter | meters | $2 \times 10^{-2} \leq D^p \leq 6 \times 10^{-2}$ |
| m | Mode field diameter in optical waveguide | meters | $6.0 \times 10^{-6}$ |
| $V_{rs}$ | Acoustic wave phase velocity | meters/second | $5.7 \times 10^3$ (in fused silica) |
| $V_{rp}$ | Acoustic wave phase velocity | meters/second | $2.8 \times 10^3$ (in piezoelectric) |
| n | Index of refraction | dimensionless | 1.46 |
| $P_{44}$–$P_{11}$ | Pockels coefficient difference | dimensionless | 1.46 |
| $\Delta P/P$ | Fractional optical pathlength change | dimensionless | $\Delta P/P > 8 \times 10^{-5}$ |
| a | Piezoelectric material dielectric strength | volts/meters | $2 \times 10^5$ |
| I | Piezoelectric material shell thickness | meters | $1 = \frac{\lambda}{2}$ |
| $f_{max}$ | Maximum modulation frequency | 1/seconds | $f = \frac{\omega}{2\pi}$ max |

TABLE 1-continued

VARIABLES IN OPTICAL PATH LENGTH CHANGE FORMULA

| VARIABLE SYMBOL | VARIABLE NAME | DIMENSIONS | VALUE ASSUMED IN PERFORMANCE ESTIMATE EXAMPLE |
|---|---|---|---|
| t | Time | seconds | independent variable |

According to the invention, maximum angular modulation frequency $\omega_{max}$ is determined by the criterion that acoustic wavelength in the waveguide medium must be approximately double the optical waveguide mode field diameter. This constraint leads to the formula for maximum angular modulation frequency:

$$\omega_{max} = \frac{2\pi V_{rs}}{2m} \quad (1)$$

In a preferred embodiment where the waveguide is optical fiber having an acoustic wave phase velocity of $5.7\times10^3$ meters/second and a mode field diameter of $6.0\times10^{-6}$ m, the numerical value of $\omega_{max}$ is $3.10^9$. This value of angular modulation frequency corresponds to a modulation frequency of:

$$f_{max} = \frac{\omega_{max}}{2\pi} = 4.8 \times 10^8 \text{ Hz} \quad (2)$$

Given the maximum angular modulation frequency $\omega_{max}$, the optimum piezoelectric transducer shell thickness in a preferred embodiment of the invention is influenced by the fact that maximum transducer drive voltage is limited by the product of dielectric strength, a, of the piezoelectric material and piezoelectric shell thickness, I, according to the formula:

$$A_0 = al \quad (3)$$

Optical path length change in the waveguide is directly proportional to drive voltage, so the maximum attainable value of $A_o$ is desired. Attainable drive voltage is limited by a trade off with maximum modulation frequency. The acoustic wavelength, $\lambda$, in piezoelectric material with maximum angular modulation frequency, $\omega_{max}$ is:

$$\lambda = \frac{2\pi V_{rp}}{\omega_{max}} \quad (4)$$

Substituting numerical values in a preferred embodiment gives:

$$\lambda = \frac{2\pi * 2.8 \times 10^3}{3 \times 10^9} = 5.9 \times 10^{-6} \text{ meters} \quad (5)$$

Pulse spreading due to propagation time in the piezoelectric medium does not become a significant factor as long as:

$$l = \frac{\lambda}{4} \quad (6)$$

A conservative approach would set I strictly according to the above criterion. However, the desire for maximum $A_o$ implies a desire for maximum I. A reasonable compromise which may be assumed for the purpose of estimating performance of the invention in a preferred embodiment is:

$$l = \frac{\lambda}{2} \quad (7)$$

Substituting numerical values gives $$l = \frac{5.9 \times 10^{-6}}{2} = 2.95 \times 10^{-6} \text{ meters} \quad (8)$$

and, using an attainable value for dielectric strength, a, of piezoelectric material of $2\times10^5$ volts/meter:

$$A_o = al = 2\times10^5 \times 2.95\times10^{-6} = 0.59 \text{ volts} \quad (9)$$

In a preferred embodiment, the acoustic impedance of all materials may be made nearly equal by a straightforward blending of materials having different acoustic impedances. For example, aluminum has a lower acoustic impedance than fused silica and titanium has a higher acoustic impedance than fused silica. Therefore, one would expect to find some ratio of titanium to aluminum in an allow which will exactly match fused silica.

In a similar way, a blend of ceramic piezoelectric material, which typically has acoustic impedance higher than fused silica with a low impedance dielectric would match the piezoelectric shell acoustic impedance to that at the inner conducting sleeve. Finally, an allow of copper, which quickly absorbs acoustic waves, with a low impedance metal is a suitable choice for the outer conducting sleeve. The need to absorb acoustic waves in the outer conducting sleeve can be reduced by making the outside diameter of the outer conducting sleeve irregular or rough in a way that spoils the focusing of acoustic waves reflected from the outer surface into the waveguide core and thereby eliminates this surface as a possible source of unwanted modulation signal interference.

An alternative means of eliminating problems due to reflections is to surround less than 180° around the waveguide core with acoustic wave source material. This approach is described in the prior art; for example, Zeemon et al in U.S. Pat. No. 4,068,191, "Acousto-optic Modulators for Optical Fiber Waveguides." The drawback to surrounding the waveguide less than 360° is that strain and optical path length changes are reduced by the square root of reduction in the transducer shell angle.

For the sake of an illustrative example, assume an electronic modulation signal voltage pulse having the form:

$$A(t) = \left[ \frac{A_o(1-\cos\omega t)}{2} \right] \quad 0 \leq t \leq \frac{2\pi}{\omega} \quad (10)$$

$$A(t) = [0] \quad t < 0, t > \frac{2\pi}{\omega}$$

Then, following Auld, *Acoustic Fields and Waves in Solids*, p. 11, p. 16, p. 83, p. 106, pp. 129–130, pp. 144–145, we have a displacement amplitude of the piezoelectric shell inside diameter, U(r,t):

$$U(r,t) = \tfrac{1}{4} d_{11} A_o (1-\cos(\omega t - kr)) \quad (11)$$

where k is wave vector amplitude, r is distance along the radial direction of wave propagation for cylindrical coordinates centered on the waveguide core. Then, particle velocity amplitude is:

$$v(r,t) = \frac{\partial U(r,t)}{\partial t} = \frac{d_{11}A_0\omega\sin(wt-kr)}{4} \quad (12)$$

The effect of propagation across the piezoelectronic to inner metal sleeve boundary is to multiply the particle velocity by transmission factor, $T_{p/m}$. The effect of propagation across the inner metal sleeve to fused silica boundary is to multiply the particle velocity by transmission factor, $T_{m/s}$.

Strain, $S(r,t)$, associated with the acoustic wave pulse is a function of fiber core particle velocity, $u(r,t)$ and acoustic wave phase velocity in fused silica $V_{rs}$ is:

$$S_r(r,t) = \frac{v(r,t)}{V_{rs}} \quad (13)$$

In a lossless uniform medium having the acoustic wave phase velocity of fused silica, $V_{rs}$, focusing gain in a cylindrical acoustic wave may be calculated based on conservation of energy. A cylindrical shell of thickness $\lambda$ just inside the electromechanical transducer contains all of the strain energy of the acoustic pulse described by equation (19) when $\omega=\omega_{max}$ and:

$$\lambda = \frac{2\pi V_{rs}}{\omega_{max}} \quad (14)$$

Volume of the shell just inside the electromechanical transducer containing the acoustic pulse strain energy and having unit length axially is:

$$\text{Volume at transducer} = \lambda\pi D_p \quad (15)$$

The maximum acoustic strain occurs at the fiber core when the acoustic wave is completely contained inside a cylinder of diameter $\lambda$. With unit axial length:

$$\text{Volume at core} = \pi\lambda^2 \quad (16)$$

Conservation of energy implies that the ratio, $G^2$, of strain energy density at the fiber core to strain energy density just inside the electromechanical transducer is:

$$G^2 = \frac{\lambda\pi D_p}{\lambda\pi^2} = \frac{D_p}{\lambda} \quad (17)$$

Combining equations (14) and (17) gives:

$$G^2 = \frac{D_p\omega_{max}}{2\pi V_{rs}} \quad (18)$$

Since strain energy density is proportional to the second power of strain, the ratio, $G$, of strain at the fiber core is to strain just inside the electromechanical transducer is:

$$G = \sqrt{\frac{D_p\omega_{max}}{2\pi V_{rs}}} \quad (19)$$

Taking into account the effect of electromechanical transducer surround angle, $\theta$, in radians gives:

$$G = \sqrt{\frac{D_p\omega_{max}}{2\pi V_{rs}} \times \frac{\theta}{2\pi}} \quad (20)$$

In a preferred embodiment, $\theta=2\pi$ and substituting the numerical value for $V_{rs}$ from Table 1 gives:

$$G = \sqrt{\frac{D_p\omega}{2\pi \times 5.7\,10^3} \times \frac{2\pi}{2\pi}} = \frac{\sqrt{D_p\omega}}{1.89 \times 10^2} \quad (21)$$

Strain and optical path length change are directly proportional to $G$. Therefore, the desire for maximum modulation effect leads to a desire for maximum $\omega$ and maximum $D_p$. Maximum useful $\omega$ has been determined above. Maximum useful $D_p$ is determined by consideration of acoustic wave attenuation in the inner conducting sleeve. Attenuation in aluminum (a typical material useful for this invention) is given by the formula for ratio of attenuated to non-attenuated acoustic wave particle velocity, $L$, taken from Auld, op. cit., p. 95.

$$L = 10^{-9.5 \times 10^{19} D_p \omega^2} \quad (22)$$

Combining the effects of focusing and attenuation of acoustic waves in the following medium gives the following formula for focusing gain in an attenuating medium:

$$LG = 10^{-9.5 \times 20^{19} D_p \omega^2} = \frac{\sqrt{D_p\omega}}{1.89 \times 10^2} \quad (23)$$

This expression has a maximum value when:

$$\frac{\partial(LG)}{\partial D_p} = 0 \quad (24)$$

which leads to a formula for the value of $D_p$ for which the effect of focusing in an attenuating medium is maximum:

$$D_p = \frac{1}{2\omega^2 \times 9.5 \times 10^{-19}} \quad (25)$$

In a preferred embodiment, maximizing the LG product for $\omega=\omega_{max}=3\times 10^9$ gives:

$$D_p = \frac{1}{2\times(3\times 10^9)^2\times 9.5\times 10^{-19}} = 0.058 \text{ meters} \quad (26)$$

and:

$$LG = 10^{-9.5\times 10^{-19}\times .058\times(3\times 10^9)^2} \times \frac{\sqrt{0.58\times 3\times 10^9}}{1.89\times 10^2} \quad (27)$$

$$LG = 10^{-.5} \times \frac{\sqrt{1.74\times 10^8}}{1.89\times 10^2}$$

$$LG = 22.1$$

Taking into account electronic signal voltage, electromechanical conversation, the displacement/particle velocity relationship, the particle velocity/strain relationship, material boundary crossings, focusing and attenuation gives a formula for maximum strain, $S_r(0)$, at the fiber core:

$$S_r(o) = \frac{GLT_{p/m}T_{m/s}d_{11}A_0\omega_{max}}{4V_{rs}} \quad (28)$$

The ratio, $\Delta P/P$, of strain induced optical path length change to optical path length (see Jarzynski, op.cit.)is:

$$\frac{\Delta P}{P} = n^2(P_{44} - P_{11})S_4(o) \quad (29)$$

Substituting numerical values and taking the average value of $\sin(k)$ over $0 \leq x \leq \pi(0.64)$ as the estimated effect on acoustic wave amplitude of pulse broadening in the electromechanical conversion medium gives:

$$\frac{\Delta P}{P} = 2.48 \times 10^{-4} \quad (30)$$

Core strain induced by the acoustic wave causes a change in the optical path length associated with a given initial physical length of optical fiber. This optical path length change may be used to shift the reflection spectrum of an in-fiber grating located in the portion of an optical fiber core exposed to focused acoustic waves. Such a reflection spectrum shift will induce amplitude modulation in a narrow bandwidth optical signal whose center frequency lies on a portion of the grating reflection spectrum displaced from the center peak. Hereinafter, said displaced portion will be described as a skirt of the grating reflection spectrum.

An in-fiber grating with 1.3×104 lines is achievable in practice. In such a grating, the condition for nearly 100% signal modulation is:

$$\frac{\Delta P}{P} \leq \frac{1}{1.3 \times 10^4} \qquad (31)$$

The ratio of numerical values for P/P from equations (30) and (31) is 3.2. As long as this ratio is greater than unity, nearly 100% modulation will be attainable over a range of modulation frequencies. If an electromechanical conversion shell diameter smaller than the maximum useful value defined by equation (24) is chosen, the lower bound on modulation frequency range will be raised, thus reducing the attainable modulation bandwidth.

In summary; 1) the maximum modulation frequency is set by the waveguide mode field size, 2) the maximum electromechanical transducer shell diameter is that for which the product of attenuation, L, and focusing gain, G, is maximum, and 3) when a modulator is fabricated having said maximum transducer shell diameter, modulation frequency may vary from $\omega_{max}$ down to a lower minimum frequency than with any other transducer shell diameter. Therefore, the most advantageous shell diameter and shell thickness are fully determined in a preferred embodiment of the invention by the criterion of maximizing modulation bandwidth.

The shell diameter and shell thickness are also fully determined by the criterion of maximizing signal bandwidth when the ratio of path length change to nominal path length must be greater than a value less than $1/1.3 \times 10^4$, corresponding to less than 100% amplitude modulation or to some predetermined magnitude of phase modulation.

It is in general an object of the invention to provide an improved optical fiber signal modulator.

Another object of the invention is to induce optical path length changes in a portion of optical fiber by focusing acoustic waves on the fiber core.

Another object of the invention is to induce optical path length changes in a portion of optical fiber which is in an arm of an optical fiber interferometer and to produce thereby a change in the optical signal amplitude at one or more output fibers of the interferometer.

Another object of the invention is to induce optical path length changes in a portion of optical fiber having an in-fiber grating and to produce thereby a change in the optical signal amplitudes reflected from and transmitted through the grating.

Another object of the invention is to modulate the reflection of an optical signal by an in-fiber grating while simultaneously receiving an optical signal transmitted undisturbed through the grating at another optical frequency.

Another object of the invention is to simultaneously and independently modulate the reflected and transmitted amplitudes of a plurality of optical carrier signals having different optical carrier frequencies, all such optical signals being transmitted over one optical fiber.

Another object of the invention is to direct a plurality of optical carrier signals entering on a first optical fiber through an optical circulator to a plurality of reflection grating modulators on a second optical fiber, whereupon the reflected portion of these optical signals passes back into the circulator and out of the circulator on a third optical fiber.

Another object of the invention is to control the reflection spectrum of an in-fiber grating by imposing steady state mechanical strain or by changing the temperature of an acoustic wave modulator and using a comparison of modulation signal input to detected modulated optical signal as a means of adjusting the grating spectrum to a predetermined center frequency in the absence of modulating acoustic waves.

Another object of the invention is to modulate the amplitude of an optical signal having bandwidth small compared to a grating reflection spectrum.

Another object of the invention is to modulate both the amplitude and the center frequency of the reflected portion of an optical signal having bandwidth larger than that of a grating reflection spectrum.

Another object of the invention is to focus an acoustic wave originating in an approximately spherical shell to obtain increased strain along a shorter portion of optical fiber relative to strain attainable with a cylindrical shell acoustic transducer.

Another object of the invention is to increase the optical path length change induced in an optical fiber modulator by producing a shock wave at the fiber core.

Another object of the invention is to use reflection grating spectral shifts and the associated transitions from transmission to reflection or vice versa of optical carrier signals as a means of routing optical signals to different destinations in an optical fiber network with routing control based on acoustic waves whose timing is synchronized with optical signals originating in the network.

Another object of the invention is to use reflection grating spectral shifts in both arms of a Mach-Zehnder interferometer to switch back and forth between a condition where substantially all of the optical power in an optical signal at a given carrier frequency near the reflection peak of the gratings is reflected through the fiber portion first coupled to the signal input fiber and a condition where substantially all of the optical power is transmitted forward on the continuation of the input fiber. The switching function is provided while allowing optical signals on the same fiber path at carrier frequencies not near that of the gratings to transmit forward without loss of optical power, thus providing a carrier frequency selective switchable low loss optical tap.

Another object of the invention is to provide carrier frequency selective switchable taps which when switched to drop an optical carrier, will at the same instant add an optical signal having the same optical carrier frequency transmitted through one of the coupled fiber portions onto the continuation of the input fiber in forward direction.

Another object of the invention is to provide parallel transmission lines each having carrier frequency selective switchable taps arranged in matched pairs so that signals dropped from one transmission line can be inserted into the parallel transmission line.

Another object of the invention is to provide a plurality of parallel transmission lines with optical signal transfer elements located at nodes of an optical fiber network for independent routing of a plurality of optical signals among nodes.

Additional objects and features of the invention will be apparent from the following description in which the preferred embodiments are set forth in detail in conjunction with the accompanying drawings.

BRIEF DESCRIPTIONS OF THE DRAWINGS

Figure 5:
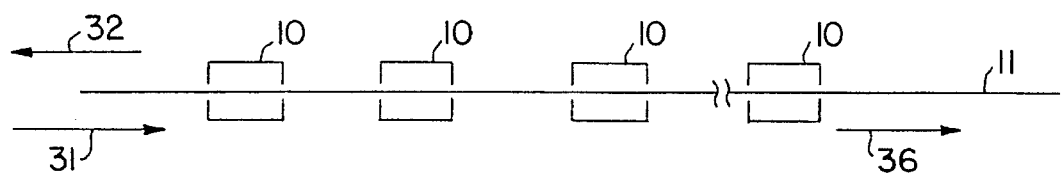

FIG. 5 is a schematic illustration of a length of optical fiber according to the invention in which a plurality of focused acoustic waves modulate the optical signal power reflected from a plurality of in-fiber gratings. A plurality of optical carrier signals associated with gratings having matching reflection spectra in the different modulators are simultaneously modulated and all modulated signals are present on the same optical fiber. Modulated carrier signals are reflected and the forward transmitted remnant of forward input carrier signals have imposed on them the complement of reflected optical carrier signal modulations. All carrier signals are modulated independently, thereby increasing the aggregate information bandwidth.

Figure 6:
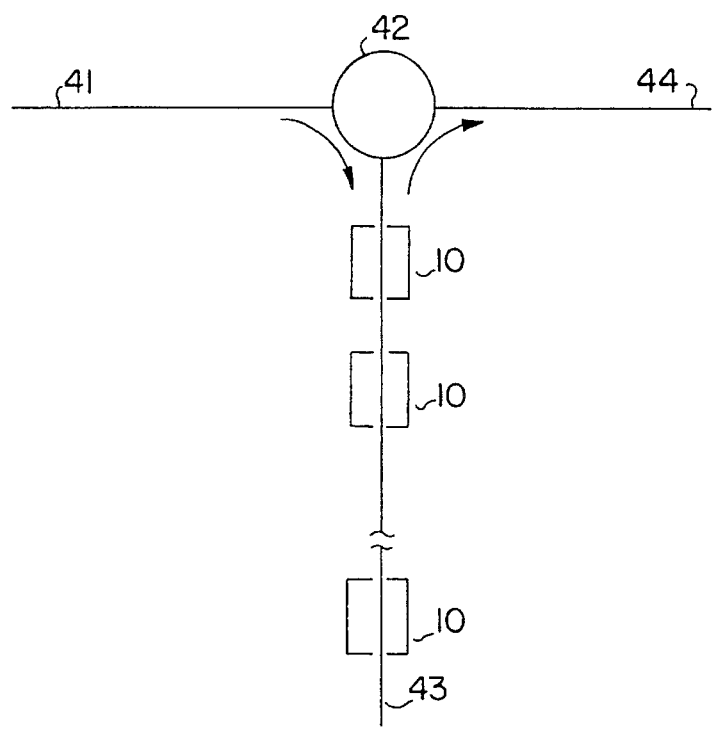

FIG. 6 is a schematic illustration of a modulation length of optical fiber to which forward input optical carrier signals are directed from an input fiber through an optical circulator and modulated reflected optical carrier signals are directed from the modulation length of optical fiber through the optical circulator onto an output fiber.

Figure 7:
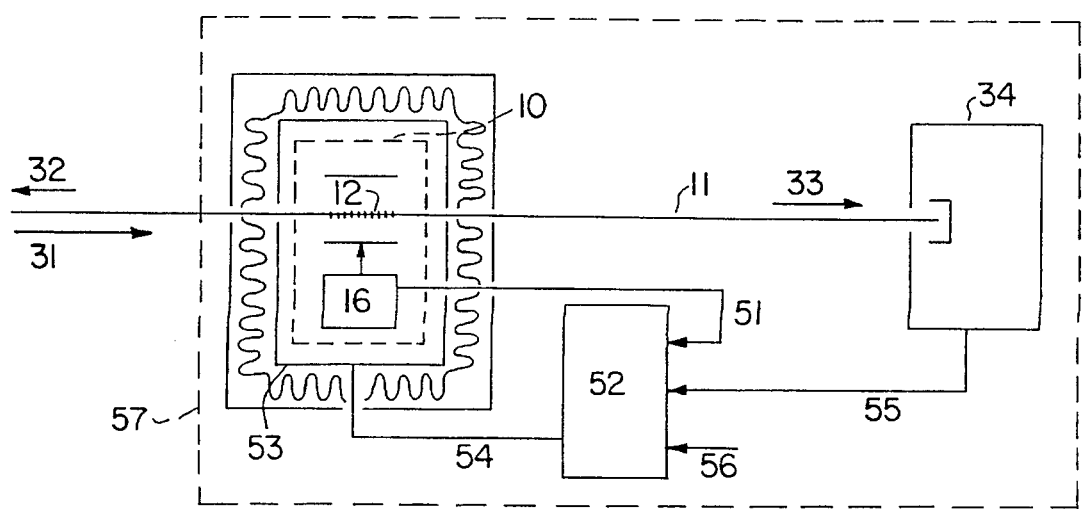

FIG. 7 is a schematic illustration of a focused wave modulator enclosed in a temperature control chamber for the purpose of controlling the steady state reflection spectrum of the in-fiber grating. Comparison of input modulation signal to detected modulated signal provides data for assessing deviation of in-fiber grating reflection spectrum from a desired set point and for providing drive signals to a thermal element or other mechanical means of modifying the steady state in-fiber grating reflection spectrum, with the result that in-fiber grating reflection spectrum is maintained in a desired steady state.

Figure 8:
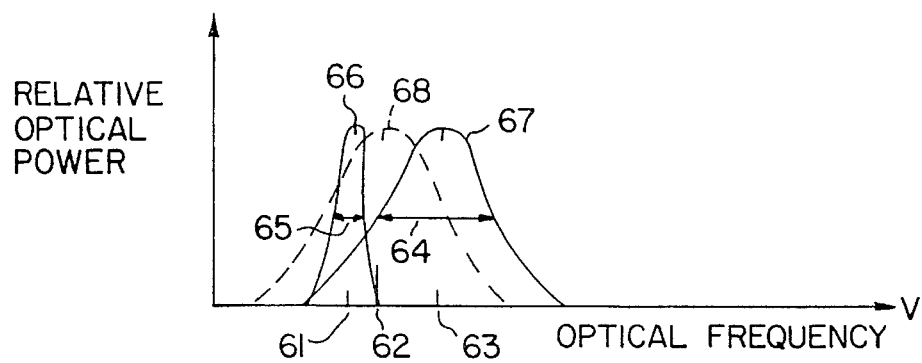

FIG. 8 is a graph showing the relative spectral width and center frequencies of in-fiber grating and optical carrier signal in a case where optical carrier signal spectral width is less than that of grating and carrier signal center frequency is on a skirt of the grating reflection spectrum. A shift in the grating spectrum amplitude modulates the reflected optical carrier signal.

Figure 9:
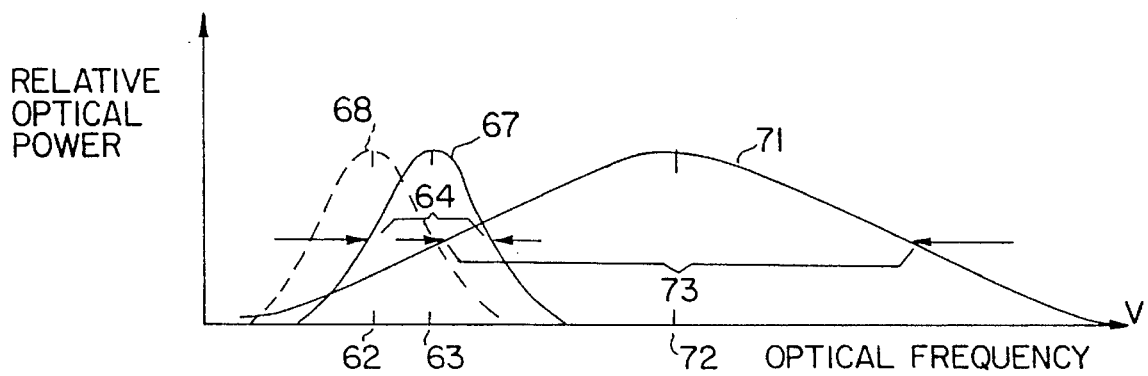

FIG. 9 is a graph showing the relative spectrual width and center frequencies of in-fiber grating and optical carrier signal in a case where optical signal carrier signal spectrual width is greater than that of grating and grating center frequency is on a skirt of the optical carrier signal spectrum. A shift in the grating spectrum produces amplitude and frequency modulation in the reflected optical carrier signal.

Figure 10:
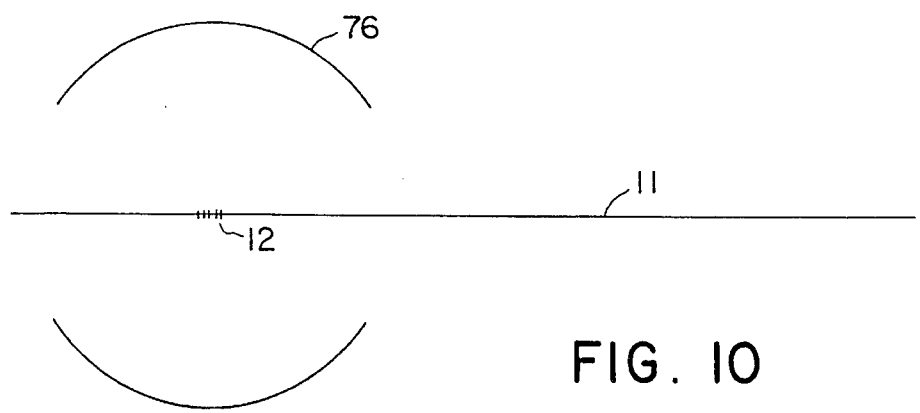

FIG. 10 is a schematic illustration of a focused acoustic wave modulator wherein the acoustic wave originates in an approximately spherical shell and, relative to a cylindrical shell acoustic transducer, produces increased strain over a reduced length of optical fiber core.

Figure 11:
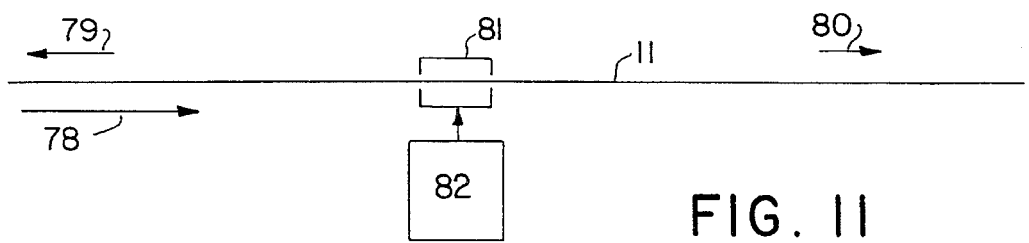

FIG. 11 is a schematic illustration of an optical fiber switch based on synchronizing acoustic waves focused on an in-fiber reflection grating with an optical signal entering the grating.

Figure 12:
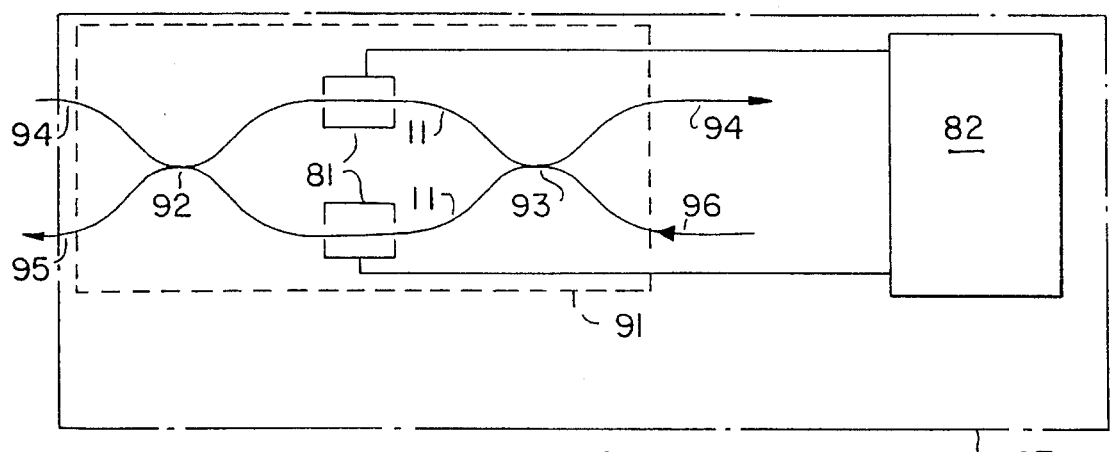

FIG. 12 is a schematic illustration of an optical switch having accessible input and output fibers based on entering optical signal synchronized with acoustic waves focused on two in-fiber gratings in the two arms of a Mach-Zehnder fiber interferometer.

Figure 13:
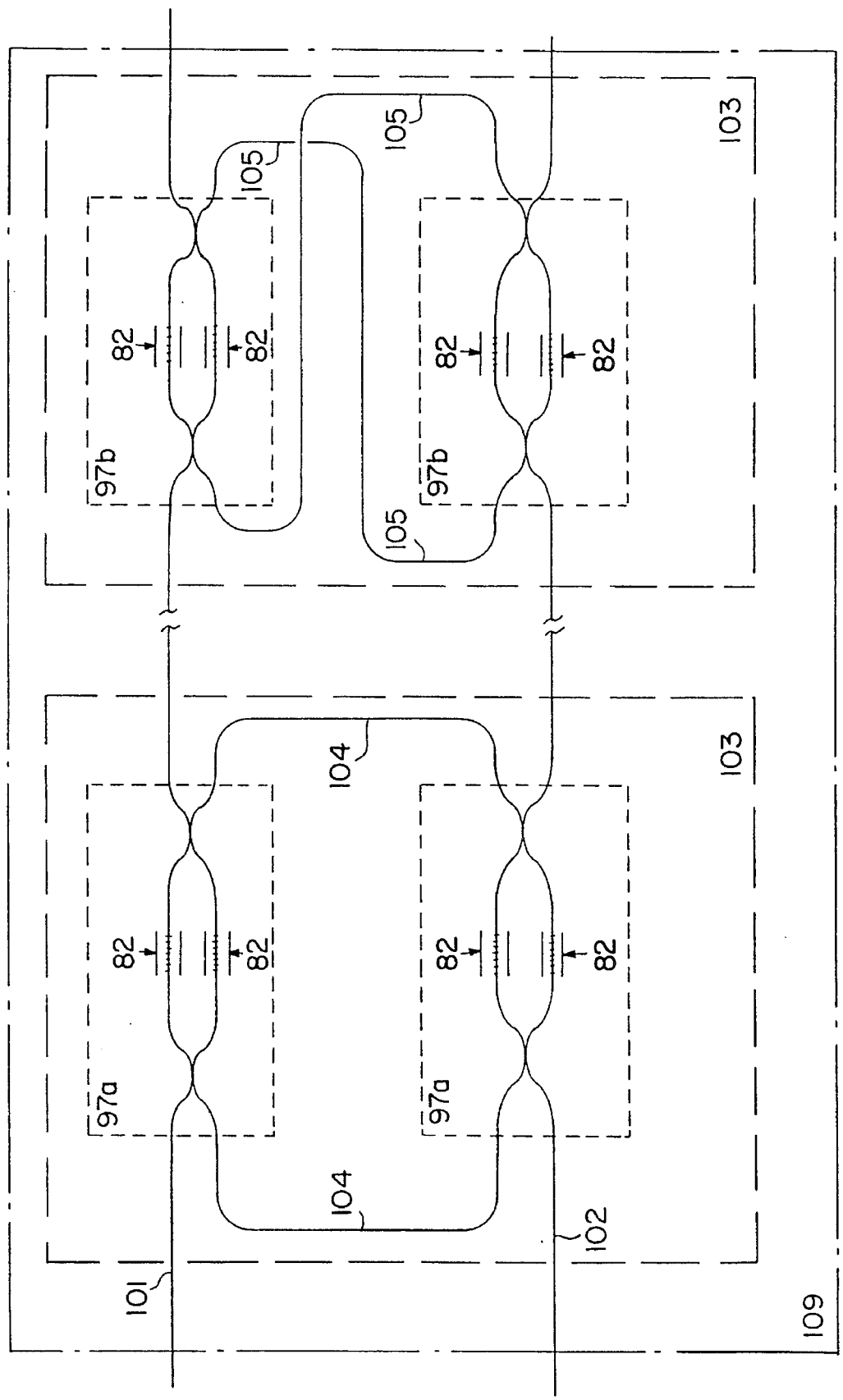

FIG. 13 is a schematic illustration of parallel optical fiber transmission lines with synchronized Mach-Zehnder switches in each line for transfer and/or exchange of optical signals between lines.

Figure 14:
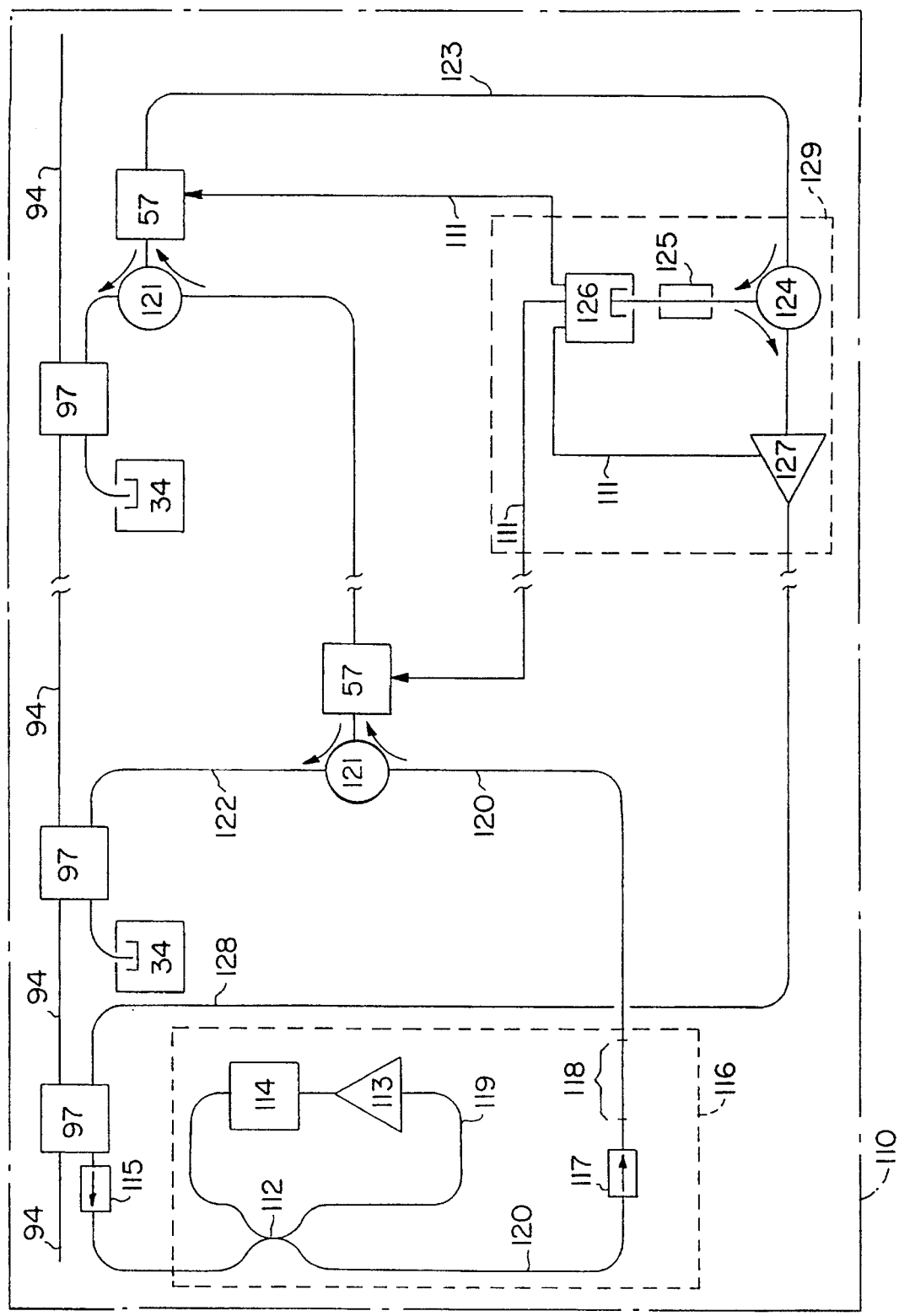

FIG. 14 is a detail of drop and insert devices arranged along a transmission line optical fiber in which regenerated optical carrier signals are modulated with new signal information and inserted onto the transmission line.

Figure 15:
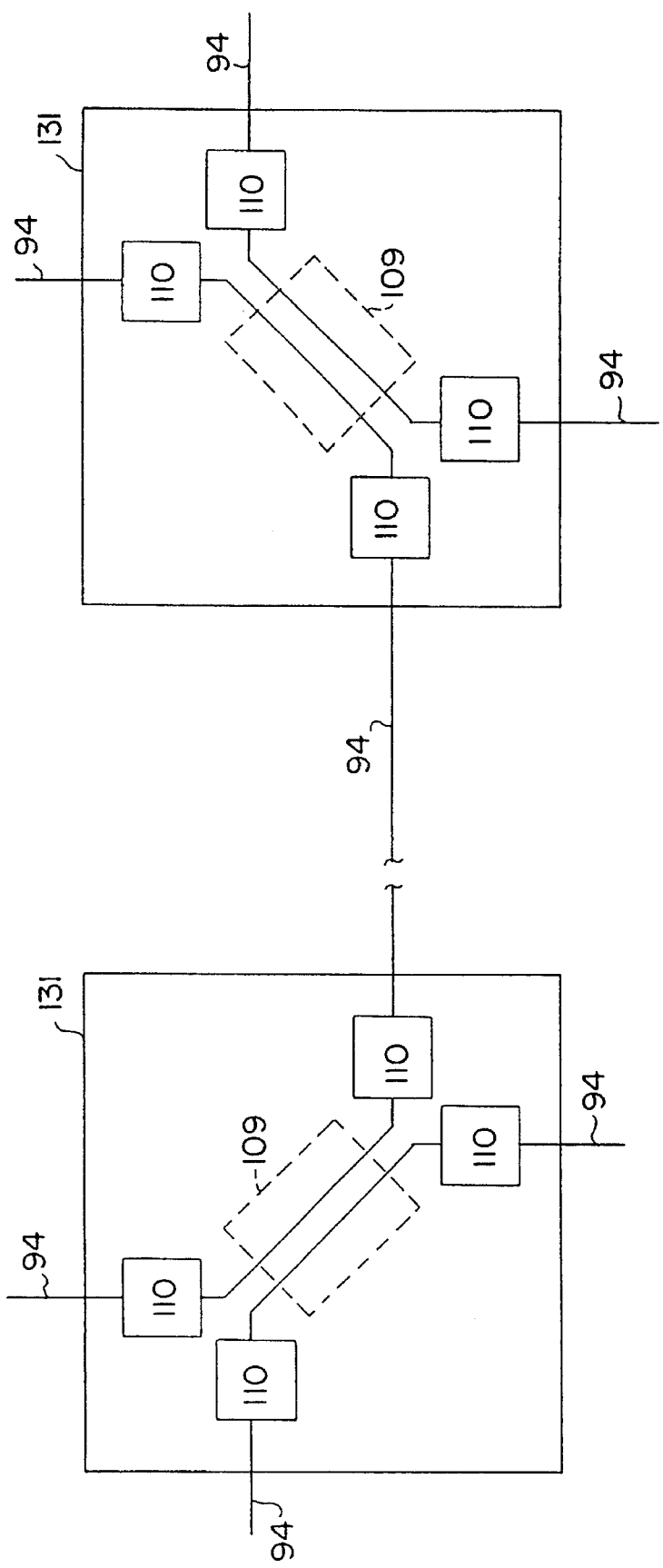

FIG. 15 is a schematic illustration of an optical fiber network in which switchable independent routing of many optical carrier frequencies is combined with drop and insertion of optical carrier signals at network nodes.

DESCRIPTION OF THE PREFERRED EMBODIMENTS

Figure 1:
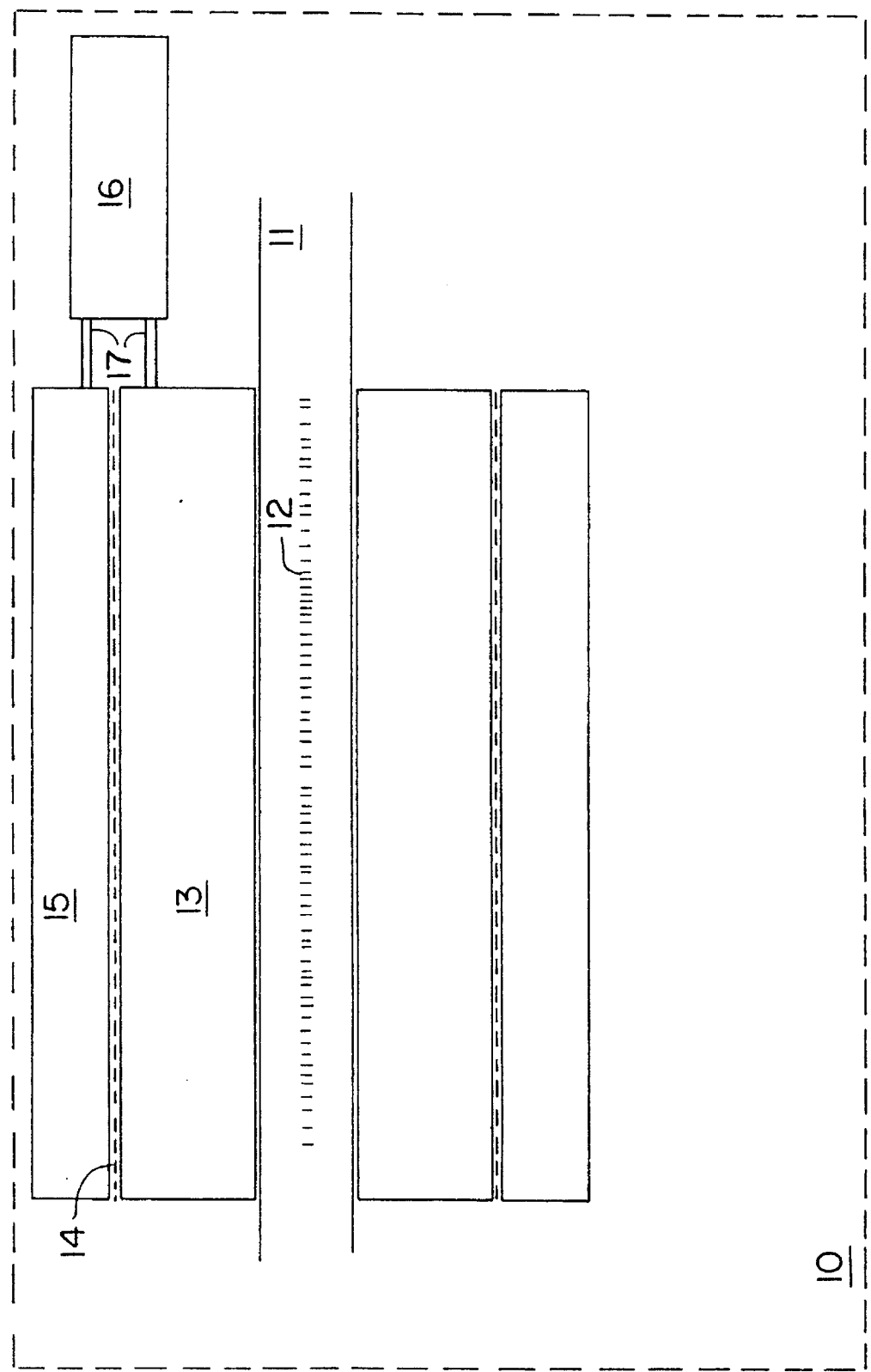
FIG. 1 is an illustration of a focused acoustic wave optical modulator according to the invention.

As illustrated in FIG. 1 the preferred embodiment of the focused acoustic wave fiber optic reflection modulator 10 device includes an optical fiber 11 having an in-fiber grating 12 at the light guiding core, an inner cylindrical metal sleeve 13 around the fiber, a thin cylindrical shell 14 of piezoelectric electromechanical conversion material around the inner cylindrical sleeve and an outer cylindrical metal sleeve 15 around the piezoelectric shell. An electronic signal 16 produces a voltage difference across the piezoelectric shell 14 which in turn produces an inward moving compressive acoustic wave at the outer surface of the inner metal sleeve 13. As the acoustic wave propagates inward from piezoelectric shell 14 through inner sleeve 13 and optical fiber 12, it becomes concentrated in smaller volumes and it produces a maximum strain in the vicinity of the fiber 11 core. When the acoustic wave arrives at the fiber 11 core, the core refractive index is changed in proportion to the induced strain at the core. The refractive index change shifts the optical frequency reflection spectrum of grating 12. The reflection spectrum shift produces a change in the grating 12 reflectivity for a narrow bandwidth optical signal having a center frequency on a skirt of the grating 12 spectrum. In order to minimize undesired acoustic reflections at material transition interfaces which tend to cause resonance and ghost signal interference with the desired modulation signal, acoustic impedance of piezoelectric shell 14, inner sleeve 13, fiber 11 and outer sleeve 15 are matched as closely as possible consistent with available materials. Outer sleeve 15 is made of a material which absorbs substantially all of the energy in an acoustic wave passing through it and/or scatters acoustic waves striking its outer surface. Fabrication of the acoustic wave modulator 10 may be accomplished by various means known in the art, all of which are within the scope of the subject invention. In a preferred embodiment, the inner metal sleeve 13 is made as an aluminum alloy casting with the optical fiber 11 cast in place. Prior to casting, the optical fiber 11 is treated, for example by exposure from the side to high intensity laser radiation in alternating bright and dark lines which form a regular pattern of damage sites in or near the fiber 11 core and thereby produce an in-fiber grating 12. The outside diameter of inner metal sleeve 13 may be precision machined to form the shape of a piezoelectric shell 14 which is applied as a thin coating to the inner metal sleeve. At this point, the piezoelectric shell 14 may be poled by exposure to a strong electric field and an elevated temperature. The outer metal sleeve 15 has an inside diameter machined to match the outside diameter of the piezoelectric shell. The outer sleeve 15 is slipped over the piezoelectric shell 14 and bonded to shell 14 using a thin layer of dielectric composite adhesive having acoustic impedance closely matched to that of the piezoelectric shell 14. Optical fiber outside diameter is approximately 125 micrometers. Inner metal sleeve 13 outside diameter is in a range from 1 to 6 centimeters. Piezoelectric shell 14 thickness is set at half the acoustic wavelength produced by the maximum modulation frequency, approximately 3 micrometers. Outer metal sleeve 15 thickness is in a range from 0.5 to 1 centimeters.

The grating 12 reflection spectrum shift is proportional to the time derivative of the electronic signal 16. Signal 16 may be in the form of pulses or periodic waves. Most of the usual electronic signal formats are attainable as intensity modulation of optical signals reflected by grating 12. The acoustic modulation effect is band limited at the high end by attainable piezoelectric shell 14 thickness and the optical fiber 11 core diameter.

Estimated attainable fractional shift of grating 12 reflection spectrum center frequency is $2.5 \times 10^{-4}$, limited by dielectric strength and electromechanical conversion characteristics, of piezoelectric shell material. This frequency shift is sufficient to change the reflectivity of a grating 12 having $4 \times 10^3$ lines from nearly zero to nearly one or vice-versa. In-fiber gratings with $1.3 \times 10^4$ lines have been demonstrated, which indicates that a substantial margin exists between predicted and required modulation effect.

Figure 2:
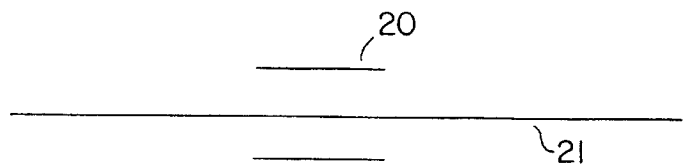
FIG. 2 is a schematic illustration of an optical path length modulator according to the invention.

In alternative configurations, the acoustic wave may be produced by means other than a piezoelectric shell. Examples of alternative acoustic wave sources are a magnetostrictive shell and mechanical vibration. The device may find applications as an acoustic wave sensor in addition to the optical signal modulation applications for which it is intended. As illustrated in FIG. 2, an alternative embodiment of the device uses a focused acoustic wave transducer 20 as described with reference to FIG. 1 to modify the refractive index of an optical fiber 21 not having an in-fiber grating in the core. The embodiment of FIG. 2 is a phase modulator of optical fiber guided waves.

Figure 3:
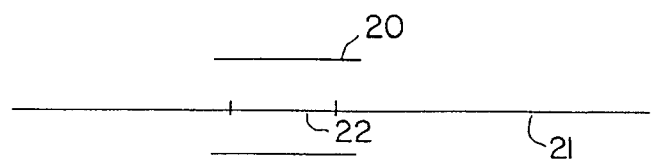
FIG. 3 is a schematic illustration of a focused acoustic wave modulating the optical path length between end reflectors of an in-fiber Fabry-Perot interferometer.

Operation of the alternative embodiment of FIG. 2 can be described with reference to FIG. 3. Focused acoustic wave transducer 20 is used to vary the optical path length between end reflectors of Fabry-Perot interferometer 22 which occupies a portion of optical fiber 21. The optical path length change shifts the transmission spectrum of the interferometer 22. In general, a focused acoustic wave transducer can be used to vary the optical path length of a portion of optical fiber contained in any type of optical fiber interferometer.

Figure 4:
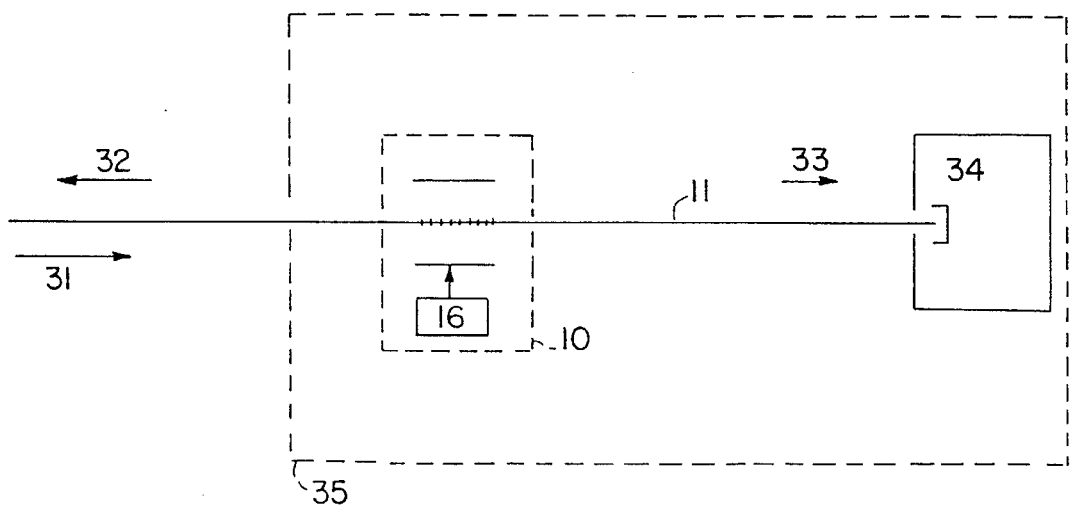
FIG. 4 is a schematic illustration of a transceiver according to the invention in which a focused acoustic wave modulates the optical signal power reflected from an in-fiber grating while a second optical signal simultaneously passes through the in-fiber grating to a detector at the fiber end.

Operation of the focused acoustic wave modulator 10 device of FIG. 1 can be described with reference to FIG. 4. A focused acoustic wave fiber optic reflection modulator 10 causes an incident optical signal 31 to be reflected by varying amounts in response to electronic signal 16. Reflected optical signal 32 therefore has modulation imposed on it. A portion 33 of incident optical signal 31 is transmitted through modulator 10. Portion 33 of optical signal 31 is modulated in such a way that reflected optical signal 32 plus transmitted portion 33 equals incident optical signal 31, neglecting signal losses. Fiber 11 is connected to a receiver 34. Use of a communication means such as time division multiplexing or frequency domain multiplexing for sharing a common line among two or more transmitters allows the focused acoustic wave modulator 10 and the receiver 34 to operate together as a transceiver 35. This approach reduces cost by eliminating the need for two optical fibers to a terminal having a need for bidirectional communication. Another cost saving attribute is the elimination of one emitter device by using modulated reflection of an optical signal 31 which is already present on the optical fiber 11.

Operation of the focused acoustic wave modulator 10 device of FIG. 1 can be further described with reference to FIG. 5. A plurality of focused acoustic wave fiber optic reflection modulators 10, lie along optical fiber 11 transmission path. Each modulator 10 independently modulates an optical signal 31 passing through optical fiber 11 having an optical frequency lying on a skirt of a distinct grating 12 reflection spectrum. As a result, the total information bandwidth is the information bandwidth of each modulator 10 multiplied by the number of modulators. The arrangement of FIG. 5 has the further advantages that each incremental modulator 10 added to optical fiber 11 transmission path adds very little attenuation to other optical signals on optical fiber 11 transmission path because all of these other signals have optical frequencies at which the optical transmission of grating 12 in the incremental modulator 10 is nearly one hundred percent. Further, the modulator 10 locations can be spread apart at some distance along optical fiber 11. The arrangement of FIG. 5 is useful for collecting transmitted information along a distributed path. Combined with an optical signal receiver as shown in FIG. 4, the arrangement of FIG. 5 is useful for sending information to be shared among host systems co-located with modulators 10. This arrangement offers the benefit of requiring only a single optical fiber for sending multiple modulated return direction signals 32 and forward direction control signals 36.

Operation of the focused acoustic wave modulator 10 device of FIG. 1 can be further described with reference to FIG. 6. Optical signals having a plurality of distinct carrier frequencies are directed from a first optical fiber 41 through an optical circulator 42 into a second optical fiber 43, A plurality of focused acoustic wave modulators 10 lie along second optical fiber 43 and at least some of the modulator 10 gratings 12 have reflection spectra matched with the carrier frequencies of some of the optical signals (matched signals) entering second optical fiber 43. Modulators 10 cause a varying portion of said matched signals to be reflected back toward circulator 42. The reflected signals, carrying new signal information, are directed through circulator 42 onto optical fiber 44. Only those optical signals entering on fiber 41 which were reflected by modulators 10 are present on optical fiber 44. All other waves guided by optical fibers 41 and 42 pass through modulators 10 and leave the portion of optical path shown in FIG. 5. The arrangement of FIG. 6 offers a means of directing optical signals in a controlled manner along fiber 43 or fiber 44 depending on time varying electronic inputs to modulators 10.

Operation of the focused acoustic wave modulator 10 device of FIG. 10 can be further described with reference to FIG. 7. Electronic modulation signal 16 is applied to modulator 10 and directed over electronic line 51 to thermal control circuitry 52. Modulator 10 rests inside an insulated chamber 53 having an inner wall with means such as embedded resistors for changing the temperature inside chamber 53. Optical signal receiver 34 converts modulated optical signal passing out of modulator 10 on optical fiber 11 to an electronic signal 55 and directs received electronic signal 55 to thermal control circuitry 52. Thermal control circuitry 52 produces changes in voltage on line 54 proportional to grating 12 reflection spectrum center frequency offset from center frequency of the modulated optical signal by for example, comparing non-linear response of the modulator 10 to known non-linear characteristics of grating 12 reflection spectrum. Thermal control circuitry 52 incorporates a compensating delay of electronic modulation signal 16 input from electronic line 51 corresponding to the acoustic propagation delay in modulator 10. The nominal offset between grating 12 reflection spectrum center frequency and optical signal center frequency may be varied in response to a set point input 56 originating from a communication system control circuit external to the subject device. This capability allows tuning a given modulator 10 to modulate one or another of a plurality of optical signals having different carrier frequencies. Control of grating 12 reflection spectrum center frequency may also be implemented by means other than thermal control, such as by mechanically stretching or compressing modulator 10 along the axis of fiber 11. Modulator 10 and means of grating 12 center frequency control together constitute tuned modulator 57.

Operation of the focused acoustic wave modulator 10 device of FIG. 1 can be further described with reference to FIG. 8, which is a graph having optical frequency abscissa and relative optical power ordinate. The graph shows typical spectral distribution 66 of a narrow band optical signal having center frequency 61 and typical spectral distribution 67 of an in-fiber reflection grating having center frequency 63. Also shown in dotted lines is a grating reflection spectrum 68 having center frequency 62. The frequency shift shown in FIG. 8 between spectrum 67 and spectrum 68 is typical of that attainable in a focused acoustic wave modulator 10 device according to the invention. The spectrum 67 will shift toward higher or lower optical frequencies depending on whether the instantaneous strain due to the acoustic wave is tensile or compressive. Spectral width 65 of the optical signal 66 is substantially less than spectral width 64 of grating 12 reflection spectrum 67. Optical signal center frequency 61 has a value relative to grating 12 reflection spectrum 67 center frequency 63 and grating 12 spectral width 64 such that a shift in grating 12 center frequency 63 creates a substantial change in the grating 12 reflectivity at the optical signal frequency 61.

Operation of the focused acoustic wave modulator 10 device can be further described with reference to FIG. 9 which is a graph having optical frequency abscissa and relative optical power ordinate. The graph shows typical spectral distribution 71 of an optical signal having center frequency 72 and typical spectral distribution 67 of an in-fiber grating having center frequency 63. Also shown in dotted lines is a grating reflection spectrum 68 having center frequency 62. The frequency shift shown in FIG. 9 between spectrum 67 and spectrum 68 is typical of that attainable in a focused acoustic wave modulator 10 device according to the invention. Spectrum width 73 of optical signal 71 is substantially greater than spectral width 64 of grating 12 reflection spectrum 67. A shift in grating 12 center frequency 63 causes grating 12 to reflect a portion of optical signal 71 spectrum having a shifted optical frequency and a change in signal amplitude. Modulator 10 produces both optical frequency modulation and amplitude modulation under the conditions of FIG. 9. The amplitude modulation effect can be minimized by setting grating 12 center frequency 67 equal to optical signal 71 center frequency 72.

Operation of the focused acoustic wave modulator 10 device can be further described with reference to FIG. 10. Electromechanical transducer is arranged in an approximately spherical shell 76 centered on reflection grating 12 which is located in the light guiding core of optical fiber 11. An acoustic wave generated in transducer shell 76 propagates inward toward grating 12 through a medium having acoustic impedance approximately matched to that of optical fiber. As the acoustic wave propagates inward from transducer shell 76, it becomes concentrated in smaller volumes and it produces a maximum strain in the vicinity of grating 12. Strain at the fiber 11 core is greater and affects a shorter length of fiber relative to the cylindrical arrangement described with reference to FIG. 1. Spherical concentration of acoustic waves is a means of producing acoustic shock waves which will expose grating 12 to increased strain over a shorter interval of time relative to linear acoustic waves below the amplitude threshold for shock wave formation.

Operation of the focused acoustic wave modulator 10 device can be further described with reference to FIG. 11. Grating 12 spectrum can be shifted by such an amount that grating 12 reflection changes from fully reflecting to fully transmitting or vice versa for a given narrow band optical signal. When modulator 10 is driven in this manner, it can be used as an optical switch 81 for controlling the exit direction of optical signals entering grating 12. Electronic switching signal 82, which may be synchronized with passage of optical signals 78 through optical switch 81, causes some optical signals 79 entering grating 12 during selected time intervals to ba fully reflected and other selected optical signals 80 entering grating 12 during other selected time intervals to be fully transmitted. This switching function is useful for directing an optical signal to a plurality of destinations at different times.

Operation of the focused acoustic wave modulator 10 device can be further described with reference to FIG. 12. Electronic switching signal 82 is directed to two identical focused acoustic wave optical switches 81, each lying in line with an optical fiber 11 which is an arm of a Mach-Zehnder interferometer 91. The optical path lengths between first coupler 92 and gratings 12 of optical switches 81 are such that optical signals entering on transmission line fiber 94 having an optical frequency which is reflected by switch 81 are directed out tap fiber 95 by interference in the Michelson interferometer formed by coupler 92, two fiber arms 11 and two reflection gratings 12. The optical path length differences between second coupler 93 and gratings are complimentary to the optical path length differences with respect to coupler 92, which the result that optical signals not reflected by switches 81 entering the Mach-Zehnder interferometer 91 are directed out of interferometer 91 on transmission line 94. Optical signals entering second coupler 93 on optical fiber 96 having optical frequencies reflected by gratings 12 are directed back through coupler 93 and out transmission line 94. Optical signals reflected by switches 91 may also be input on fiber 95, in which case such optical signals will pass through coupler 92 and reflect back through coupler 92 onto transmission line 94. Optical signals reflected by switches 91 may also be input to coupler 93 from transmission line 94, in which case such optical signals will pass through coupler 93 and reflect back through coupler 93 onto optical fiber 96. Regardless of propagation distribution, optical signals entering interferometer 91 on transmission line 94 not reflected by switches 81 will pass through Mach-Zehnder interferometer 91 and propagate forward on transmission line 94. Mach-Zehnder interferometer 91 incorporating Michelson interferometers, optical switches 81 and electronic switching signal 82 constitutes an optical frequency selective drop and insert tap 97 with accessible input and output fibers in line with transmission fiber 94. Electronic switching signal 82 may be synchronized with information bearing modulation of signals having optical frequencies which are reflected or not by switches 81 depending on switching signal 82, with the result that selected optical signals may be tapped during only selected time intervals and transmitted forward during the remaining time intervals. The switches 81 may be tuned to different optical frequencies as described with reference to FIG. 7. Several optical frequency selective taps 97 may lie along a single transmission line optical fiber 94.

Operation of the focused acoustic wave modulator 10 device can be further described with reference to FIG. 13. A plurality of optical taps 97 are distributed along parallel transmission line optical fibers 101 and 102, each optical tap 97 in fiber 101 is matched with a tap 97 in fiber 102 having gratings 12 with the same reflection spectrum center frequency. Electronic switching signals 82 to the matched taps are synchronized so that signals dropped from fiber 101 are inserted in fiber 102 and signals dropped from fiber 102 are inserted in fiber 101. Taken together, the matched taps 97 constitute optical transfer units 103. In the event that an optical signal reflected by gratings 12 in a given optical transfer unit 103 is present only on one or the other but not both of fibers 101 and 102, then a one way transfer in initiated by electronic switching signals 82. Optical fibers 104 connecting optical taps 97a are connected in such a way that the transfer of optical signals reverses the direction of optical signal propagation. Optical fibers 105 connecting taps 97b are connected in such a way that the transfer maintains an original direction of optical signal propagation. Gratings 12 within taps 97 may be tuned as described with reference to FIG. 7, thereby reducing the number of optical signal frequencies used in a communication system. Taken together, the optical transfer units 103 along a given length of transmission line optical fiber 101 and 102 constitute transfer and exchange section 109.

Operation of the focused acoustic wave modulator 10 device can be further described with reference to FIG. 14. An optical signal having a standard frequency found consistently throughout an optical network is not modulated but is used as a frequency standard and input for regenerating optical carrier signals on which new information bearing modulation will be imposed for new signal insertion at optical taps 97. At the beginning of a transmission line optical fiber 94 drop and insert section 110, a tap 97 tuned to a pilot frequency directs the pilot frequency optical signal through an optical isolator 115 to coupler 112. A portion of pilot frequency optical signal is coupled into an optical fiber loop 119 which includes an optical amplifier 113 and a frequency shifting device 114. The frequency shifting device may be an acoustic-optic bragg cell or retention of Brillouin amplified optical signals in the loop 119. Gain in the optical amplifier is set approximately equal to loop losses so that many shifted frequency optical signals are transmitted forward on optical fiber transmission path 120 through optical isolator 117 and in-fiber Fabry-Perot 118, which transmits a set of optical signals separated by sufficient frequency differences that a given grating 12 modulator 10 will modulate only one optical signal. Coupler 112, fiber loop 119, optical isolator 117 and in-fiber Fabry-Perot 118 together comprise an optical carrier signal generation unit 116. Output from optical carrier signal generation unit 116 continues along optical fiber transmission path 120 through optical circulator 121 and enters a first tuned modulator 57. Modulated optical signal reflected from first tuned modulator 57 passes back through circulator 121 onto optical fiber transmission path 122, which is a signal insertion port of a first optical tap 97 tuned to the same optical frequency as first tuned modulator 57. Optical signals passing through first tuned modulator 57 proceed through a series of circulator coupled tuned modulators 57 whose frequencies are matched to those of associated taps 97. At a final jth tuned modulator 57, optical signals not modulated in any tuned modulator 57 of the series 1 through j are transmitted forward onto optical fiber path 123, which leads through optical circulator 124 to modulator 125 tuned to the pilot signal carrier center frequency. A low amplitude sinusoidal modulation in this arrangement will produce a frequency doubled modulation of optical signal entering receiver 126 in which the equality of alternate cycles provides feedback to keep the grating 12 reflection spectrum of modulator 125 centered on optical pilot signal frequency. In addition, transmitted portions of all tuned modulators 57 are directed to receiver 126. By correlating delayed electronic modulating signal input to tuned modulators 57 one at a time with the aggregate signal, an indication of the departure from correct tuning of each tuned modulator 57 can be derived in the manner described with reference to FIG. 7, electronic feedback signal 111 may then be directed to the selected tuned modulators 57 in turn to keep all modulators tuned correctly in relation to their modulated optical signals.

The pilot optical signal is reflected by tuned modulator 125 and passes through circulator 124 to optical amplifier 127. The optical power gain in optical amplifier 127 is adjusted to achieve a predetermined pilot optical signal power using feedback from circuitry associated with receiver 126. The pilot optical signal is directed into optical fiber insert port 128 of tuned tap 97 which forwards it onto transmission line optical fiber 94. Circulator 124, tuned modulator 125, receiver 126 and associated electronics and optical amplifier together constitute opto-electronic feedback unit 129. The transmission line optical fiber, tuned taps 97 carrier signal regeneration loop 116, isolator 117, in-fiber Fabry-Perot interferometer 118, receivers 34, circulators 1 21 and opto-electronic feedback unit 129 together constitute a drop and insert section 110 of an optical fiber communication network. Using the functional capabilities of tuned modulators 57, a drop and insert section 110 can receive all or selected parts of a plurality of optical carrier signals and can insert new information bearing modulated optical signals simultaneously with receiving dropped optical signals at the selected optical frequencies.

Operation of the focused acoustic wave modulator 10 device can be further described with reference to FIG. 15. Optical fiber communication network nodes 131 are connected by transmission line optical fibers 94, which carry bidirectionally a plurality of optical signals. Each node 131 has drop and insert sections at entrance and exit points of transmission line optical fibers 94. Each node also has a transfer and exchange section 109 along a parallel section of two transmission line optical fibers 94. The network node 131 configuration of FIG. 15 allows for rapidly reconfigurable routing of optical signals originating in any node and received in whole or in part at any other node 131 of an optical network comprised of interconnected nodes 131 and transmission line optical fibers 94.

I claim:

1. An acousto-optic device comprising, an optical fiber waveguide for propagating an optical carrier signal along an optical path, carrier signal generating means providing an optical carrier signal to said optical fiber waveguide, a focused acoustic wave transducer for modulating the optical carrier signal, said transducer including, an inner electrode having an inner surface at least partially surrounding and in energy transfer relation with the optical fiber and an outer surface, a thin shell of electromechanical conversion material having an inner and an outer surface with its inner surface being in the energy transfer relation with to the outer surface of said first electrode, an outer electrode having an inner and an outer surface with its inner surface in energy transfer relation with the outer surface of said thin shell, and electrical signal generating means connected to said inner and said outer electrodes and operable to apply an electrical signal across said thin shell of electromechanical conversion material to thereby produce inwardly and outwardly directed acoustic waves in said inner and said outer electrodes, respectively, said inner electrode having a thickness and shape to focus said inwardly directed acoustic waves along a line near the center of the waveguide to induce strain producing a proportional change in the refractive index of the optical fiber waveguide at the line of focus to produce a phase shift in the optical carrier signal, said outer electrode being formed of a material and having a thickness such that said outwardly directed acoustic waves are substantially completely attenuated therein.

2. The invention defined in claim 1 wherein said thin shell of electromechanical conversion material has a thickness approximately equal to half the minimum acoustic wavelength in the electromechanical conversion material, said minimum acoustic wavelength being determined as that for which the corresponding acoustic wavelength in the optical waveguide material equals approximately twice the optical waveguide mode field diameter and wherein said thin shell of electromechanical conversion material has a diameter for which the product of acoustic wave particle velocity focusing gain multiplied by acoustic wave particle velocity attenuation in said inner electrode material has a maximum value.

3. The invention defined in claim 2 wherein said inner electrode, said electromechanical conversion material, said outer electrode and said optical fiber waveguide are all comprised of materials having approximately equal acoustic impedance whereby acoustic energy having passed through the optical waveguide will not be reflected back toward the optical waveguide to the extent of causing deleterious echo modulation or resonance effects in said acousto-optic device.

4. The invention defined in claim 1 wherein said acousto-optical device comprises a Fabry-Perot interferometer, and wherein said optical fiber waveguide defines a portion of the optical path between the end reflectors of the interferometer, said focused acoustical wave being effective to change the optical path length between said end reflectors.

5. The invention defined in claim 1 wherein said acousto-optical device comprises a Mach-Zehnder interferometer having one of said optical fiber waveguides on each arm thereof.

6. The invention defined in claim 1 wherein said inner and said outer surfaces of said first electrode, said inner and said outer surfaces of said thin shell and said inner surface of said outer electrode are substantially right circular cylindrical surfaces.

7. The invention defined in claim 1 wherein said outer surface of said inner electrode and said outer surface of said thin shell are convex surfaces and said inner surface of said thin shell and said inner surface of said outer electrode are concave surfaces whereby said inwardly directed acoustic waves are concentrated along a length of said line near the center of said waveguide which is shorter than the length of said focused acoustic wave transducer.

8. The invention defined in claim 7 wherein said curved surfaces are substantially spherical surfaces.

9. An acousto-optic device comprising, an optical fiber waveguide for propagating an optical carrier signal along an optical path, an in-fiber grating located on a line near the central core of the optical fiber of said optical fiber waveguide, carrier signal generating means providing an optical carrier signal to said optical fiber waveguide, a focused acoustic wave transducer for modulating the optical carrier signal, said transducer including, an inner electrode having an inner surface at least partially surrounding and in energy transfer relation with the optical fiber and an outer surface, a thin shell of electromechanical conversion material having an inner and an outer surface with its inner surface being in energy transfer relation with the outer surface of said first electrode, an outer electrode having an inner and an outer surface with its inner surface in energy transfer relation with the outer surface of said thin shell, and electrical signal generating means connected to said inner and said outer electrodes and operable to apply an electrical signal across said thin shell of electromechanical conversion material to thereby produce inwardly and outwardly directed acoustic waves in said inner and said outer electrodes, respectively, said inner electrode having a thickness and shape to focus said inwardly directed acoustic waves along said line at the optical fiber central core containing said grating to induce strain producing a proportional change in the refractive index of the optical fiber waveguide to produce a reflection spectrum shift in the grating, at the line of focus whereby the reflection change produces a grating reflection change for a narrow bandwidth optical signal on a skirt of the grating spectrum and thereby modulate the optical carrier signal, said outer electrode being formed of a material and having a thickness such that said outwardly directed acoustic waves are substantially completely attenuated therein.

10. The invention defined in claim 9 wherein said acousto-optic device comprises a circulator, an input optical fiber directing a plurality of forward input optical carrier signals having distinct carrier frequencies into the circulator, an output optical fiber for transmitting modulated carrier signals from the circulator, and wherein said optical fiber waveguide is connected to said circulator between said input and said output optical fibers, said optical fiber waveguide comprising a plurality of in-fiber gratings located on said line near the central axis of the optical fiber of said optical fiber waveguide, at least a portion of said gratings having reflective spectra matched with some of the input optical carrier frequency signals, and a plurality of focused acoustic wave modulators along the optical fiber of said optical fiber waveguide each operable to direct inward acoustic waves focused on said line containing said in-fiber gratings whereby said focused acoustic wave modulators reflect a portion of the matched signals back to the circulator for direction therefrom through said output optical fiber.

11. The invention defined in claim 9 wherein said acousto-optical device comprises a Michelson interferometer, and wherein said optical fiber waveguide defines a portion of the optical path of said Michelson interferometer.

12. The invention defined in claim 9 wherein said optical carrier signal width is less than that of the grating, and wherein said carrier frequency is on a skirt of the grating reflection spectrum.

13. The invention defined in claim 9 wherein said optical carrier signal width is greater than that of the grating, and wherein the grating center frequency is on a skirt of the optical carrier signal spectrum.

14. The invention defined in claim 9 wherein said outer surface of said inner electrode and said outer surface of said thin shell are convex surfaces and said inner surface of said thin shell and said inner surface of said outer electrode are concave surfaces whereby said inwardly directed acoustic waves are concentrated along a length of said line near the center of said waveguide which is shorter than the length of said focused acoustic wave transducer.

15. The invention defined in claim 9 wherein said acousto-optic device comprises a transceiver, and wherein said focused wave acoustic transducer produces an acoustic wave modulating the reflectivity of said grating while permitting the portion of the incoming optical signal not reflected by said grating to pass through to a detector at the end of the optical fiber waveguide, said reflected and modulated portion added to the non-reflected portion substantially equalling said incoming signal.

16. The invention defined in claim 15 wherein said acousto-optic device comprises a time division multiplexing communications device incorporating at least two transmitters sharing a common fiber optic carrier line for bi-directional communications.

17. The invention defined in claim 15 wherein said acousto-optic device comprises a frequency domain multiplexing communications device incorporating at least two transmitters sharing a common fiber optic carrier line for bi-directional communications.

18. The invention defined in claim 9 wherein said acousto-optic device comprises a plurality of said gratings having reflection spectra matched to different optical frequencies, and a plurality of said focused acoustic wave transducers located along said optic fiber, each said focused acoustic wave transducer being located and operable to individually modulate an optical signal reflected from a specific grating in the optic fiber waveguide and having an optical frequency lying on a skirt of said specific grating reflection spectrum.

19. The invention defined in claim 18 wherein said acousto-optic device comprises a transceiver, and wherein each said focused wave acoustic transducer modulates both reflection and transmission of a selected incoming optical signal and wherein reflected and transmitted portions of said modulated optical signal substantially equal said incoming optical signal.

20. The invention defined in claim 19 further comprising reflection spectrum index control means for controlling the steady state reflection spectrum of said in-fiber grating, said control means including comparison means for comparing the electrical signal applied across said thin shell to the modulated optical signal transmitted through said grating, and means responsive to a deviation between detected signal and a predetermined reference signal, said reference signal being the expected result of a small single frequency modulation added to said electrical signal, said means acting to shift the steady state in-fiber reflection spectrum in proportion to said deviation so as to maintain a substantially fixed relationship between optical signal frequency and reflection spectrum of said grating.

21. The invention defined in claim 18 wherein said acousto-optic device comprises a time division multiplexing communications device incorporating at least two transmitters sharing a common fiber optic carrier line for bi-directional communications.

22. The invention defined in claim 18 wherein said acousto-optic device comprises a frequency domain multiplexing communications device incorporating at least two transmitters sharing a common fiber optic carrier line for bi-directional communications.

23. The acousto-optical device defined in claim 9 further comprising reflection spectrum index control means for controlling the steady state reflection spectrum of said in-fiber grating, said control means including comparison means for comparing the electrical signal applied across said thin shell to the modulated optical signal reflected from said grating, and means responsive to a detected predetermined deviation in the compared frequencies for modifying the steady state in-fiber grating reflection spectrum.

24. The invention defined in claim 23 wherein said refraction index control means comprises a temperature control chamber enclosing said waveguide, said temperature control chamber including means for controlling the temperature of the waveguide.

25. An acousto-optic device comprising, an optical fiber waveguide for propagating an optical carrier signal along an optical path, an in-fiber grating located on a line near the central core of the optical fiber of said optical fiber waveguide, signal generating means providing an optical carrier signal to said optical fiber waveguide, a focused acoustic wave transducer for modulating the optical carrier signal, said transducer including, an inner electrode having an inner surface at least partially surrounding and in energy transfer relation with the optical fiber and an outer surface, a thin shell of electromechanical conversion material having an inner and an outer surface with its inner surface being bonded to the outer surface of said first electrode, and an outer electrode having an inner and an outer surface with its inner surface in energy transfer relation with the outer surface of said thin shell, and signal generating means connected to said inner and said outer electrodes and operable to apply an electrical signal across said thin shell of electromechanical conversion material to thereby produce inwardly and outwardly directed acoustic waves in said inner and said outer electrodes, respectively, said in-fiber grating having a spectrum capable of being shifted from a fully transmitting grating to a fully reflecting grating for a given narrow band optical signal by application of strain resulting from a focused acoustic wave from said focused acoustic wave transducer to thereby produce an acoustic wave optical switch for controlling the exit direction of an optical signal entering said grating, and wherein said signal generating means is operable to provide a switching signal to said focused acoustic wave transducer to produce a focused acoustic wave shifting said grating between said fully transmitting and said fully reflecting spectra.

26. The invention defined in claim 25 further comprising synchronizing means for synchronizing the switching signal with optical signals entering said grating whereby optical signals entering the grating may be selectively fully transmitted or fully reflected during specific time intervals.

27. The invention defined in claim 26 wherein said inner electrode having a thickness and shape to focus said inwardly directed acoustic waves along said line at the optical fiber central core containing said grating to induce strain producing a proportional change in the refraction index of the optical fiber waveguide to produce a reflection spectrum shift at the line of focus and thereby modulate the optical carrier signal whereby the reflecting shift produces a grating reflection change for a narrow band width optical signal on a skirt of the grating spectrum, and said outer electrode being formed of a material and having a thickness such that said outwardly directed acoustic waves are substantially completely attenuated therein.

28. The invention defined in claim 25 wherein said acousto-optic device comprises a Mach-Zehnder interferometer having one of said optical fiber waveguides on each arm thereof.

29. The invention defined in claim 28 wherein the acoustic wave switches function as reflectors when the acoustic wave amplitude is such as to cause the reflection grating spectrum to have a maximum value at a selected optical signal frequency and wherein said switches acting as reflectors then form two reflection elements of a Michelson interferometer and wherein the relative optical waveguide lengths in the two interferometer arms are such that substantially the entire magnitude of said selected optical signals entering the Michelson interferometer arms through the first of two coupled fibers exits the Michelson interferometer through the second of said two coupled fibers, said acoustic wave switches being arranged in a transmitting or reflective state by the action of electronic signals generating acoustic waves which momentarily change said acoustic wave switches from a static state to the alternate state, said acoustic wave switches being arranged to transmit all optical signals which are not reflected.

30. The invention defined in claim 29 wherein said optical waveguide forming said arms of said Mach-Zehnder interferometer have relative lengths such that substantially all of said selected optical signals entering the Mach-Zehnder interferometer on a first single waveguide connected to an optical signal source through a first of two optical waveguide couplers passes through the second of said optical waveguide couplers onto a second single waveguide and wherein a plurality of optical signals having approximately equal optical frequencies each pass through said Mach-Zehnder interferometer in the same manner and with substantially all of their optical power coupled to the same exit waveguide from said Mach-Zehnder interferometer.

31. The invention defined in claim 30 wherein optical waveguide lengths within said Mach-Zehnder interferometer are such that said Mach-Zehnder interferometer is converted by the action of said switches to Michelson interferometers coupling said selected optical signals onto an optical waveguide different from the waveguide on which said optical signals entered said Michelson interferometers for each of two possible transmission directions through said Mach-Zehnder interferometer, said optical signals which may be traveling in either or both of two possible directions along a waveguide continuous with said Mach-Zehnder interferometer being referred to hereinafter as bidirectional optical signals; and said Mach-Zehnder interferometer being converted into Michelson interferometers coupling bidirectional signals onto one of two exit waveguides corresponding to the two possible transmission directions through said Mach-Zehnder interferometer by the action of said switches being referred to hereinafter as a switched Mach-Zehnder/Michelson pair interferometer.

32. The invention defined in claim 31 wherein selected optical signals enter an exit waveguide of said switched Mach-Zehnder/Michelson pair interferometer, pass through said coupler onto two waveguides comprising Michelson interferometer arms, reflect back onto said two waveguides, pass through said coupler and onto said waveguide along which said Mach-Zehnder interferometer is arranged, said optical signal following an identical path but in the reverse direction to optical signals directed away from said waveguide continuous with said Mach-Zehnder interferometer onto said exit waveguide, such exit waveguides operable in reverse as entrance waveguides being referred to hereinafter as drop/insert taps.

33. The invention defined in claim 32 wherein a first and second optical waveguide are each continuous with a plurality of switched Mach-Zehnder/Michelson pair interferometers, each of said switched Mach-Zehnder/Michelson pair interferometers on said first waveguide being arranged to pass selected bidirectional optical signals to a corresponding switched Mach-Zehnder/Michelson pair interferometer on said second waveguide, the direction of optical signal transmission on said second waveguide being determined by which of two drop/insert taps on said switched Mach-Zehnder/Michelson pair interferometer on said second waveguide is continuous with the drop/insert tap to which an optical signal is directed from said switched Mach-Zehnder/Michelson pair interferometer on said first waveguide and wherein selected bidirectional optical signals may be passed from said second optical waveguide to said first optical waveguide in the same manner as hereinabove described for passing selected bidirectional optical signals to said second optical waveguide from said first optical waveguide, said first and second optical waveguides and said switched Mach-Zehnder/Michelson pair interferometers being referred to herewith as switched optical signal transfer stations.

34. The invention defined in claim 32 wherein a plurality of said switched Mach-Zehnder/Michelson pair interferometers are arranged along an optical waveguide carrying optical signals, a first of said switched Mach-Zehnder/Michelson pair interferometers being arranged to tap a first optical signal having a predetermined optical frequency higher than optical frequencies which other said switched Mach-Zehnder/Michelson pair interferometers along said optical waveguides are arranged to select, said first Mach-Zehnder/Michelson pair interferometer directly said first optical signal to a coupler connected to a circulating optical waveguide wherein each pass exposes said first signal and successive signals generated therefrom to optical amplification and frequency conversion of a sufficient portion of the optical signal power that along ladder of frequency converted optical signals is coupled out of said circulating optical waveguide carrying said first optical signal, said continuation waveguide being continuous with an in-fiber Fabry-Perot interferometer which transmits only those frequency converted optical signals separated by an integer multiple of said frequency conversion interval wherein said transmitted frequency converted optical signals are separated by sufficient frequency intervals to be resolved by in-fiber gratings which select different optical signals in said switched Mach-Zehnder/Michelson pair interferometers arranged along said optical waveguide, wherein said frequency converted optical signals pass through a first optical circulator to a reflection modulator comprised of an in-fiber grating and means of rapidly shifting the reflection spectrum of said in-fiber grating in response to an input electronic signal such that a reflected modulated optical signal is directed back through the optical circulator onto an optical waveguide leading to a first drop/insert tap of a second said Mach-Zehnder/Michelson pair interferometer for transmission along said optical waveguide continuous with a plurality of said switched Mach-Zehnder/Michelson pair interferometers, the second drop/insert tap of said second switched Mach-Zehnder/Michelson pair interferometer and of subsequent Mach-Zehnder/Michelson pair interferometers being devoted to detection of selected optical signals, wherein optical signals transmitted through said reflection modulator and having different frequency shift increments than that selected by said in-fiber grating of said reflection modulator may be selected and reflection modulated by a subsequent reflection modulator and thereby directed to a subsequent Mach-Zehnder/Michelson pair interferometer for transmission along said optical waveguide continuous with a plurality of said switched Mach-Zehnder/Michelson pair interferometers wherein optical signals transmitted through a plurality of said reflection modulators may pass through a final optical circulator to a section of optical waveguide having an in-fiber grating which reflects said optical signal having said predetermined optical frequency selected by said first switched Mach-Zehnder/Michelson pair interferometer and directs said reflected optical signal back through said final optical circulator, through an optical amplifier and through a drop/insert top of said first Mach-Zehnder/Michelson pair interferometer onto said optical waveguide continuous with a plurality of said switched Mach-Zehnder/Michelson pair interferometers, wherein said optical signals passing through said final optical circulator which are not reflected by said in-fiber grating pass through said in-fiber grating to a detector, wherein an electronic circuit tuned to different single frequency tones added to each of the electronic signals modulating the reflection and transmission of optical signals passing through said reflection modulators are individually detected and compared with nominal amplitudes and wave shapes for said single frequency tones to generate corrections to a thermal tuning circuit used to maintain each of said reflection modulators in a correct relation with the modulated optical signal and wherein a single frequency tone modulating reflectivity of said in-fiber grating is also individually detected and compared with a nominal amplitude wave shape to generate a correction to the magnitude of optical amplification applied to said optical signal directed toward said drop/insert tap of said first Mach-Zehnder/Michelson pair interferometer, said electronic thermal tuning and amplification maintaining circuitry serving to balance the relative amplitudes of all optical signals passing forward onto the continuation of said optical waveguide continuous with a plurality of said switched Mach-Zehnder/Michelson pair interferometers, said optical waveguide, Mach-Zehnder/Michelson pair interferometers, associated reflection modulators, associated shifted frequency optical signal generation and associated electronic control circuitry being referred to hereinafter as a drop and insert stage.

35. The invention defined in claim 34 wherein an optical network having switched optical interconnections is comprised of adjacent nodes connected by optical waveguides in a two dimensional pattern, each node having drop and insert stages at node entrance and exit points and switched optical signal transfer stations in parallel sections of optical waveguides between said entrance and exit points.

36. A method of modulating an optical signal passing through an elongated optical fiber waveguide comprising:

providing an in-fiber grating on a line near the central core of the optical fiber of the optical fiber waveguide, directing an optical carrier signal longitudinally through the optical waveguide, providing an inner electric conductor having an inner surface at least partially surrounding and in energy transfer relation with the external surface of the optical fiber of the waveguide, and an outer surface, providing a thin shell of electromechanical conversion material having an inner surface and an outer surface, with said inner surface bonded to the outer surface of the inner electrical conductor, providing an outer electrical conductor having an inner surface in contact with said outer surface of said thin shell of electromechanical conversion material, and applying a high frequency electrical signal across said thin shell of electromechanical conversion material through said inner and outer electrical conductors to thereby produce inwardly and outwardly directed high frequency acoustic waves in said thin shell of electromechanical conversion material and in said inner and said outer electrical conductors, respectively, said inner electrical conductor having a thickness and shape to focus said inwardly directed acoustic waves along the line containing the in-fiber grating to induce strain producing a proportional change in the refractive index of the waveguide of the optical fiber waveguide to produce a reflection spectrum shift in the grating at the line of focus whereby the reflection shift produces a grating reflection change for a narrow bandwidth optical signal on a skirt of the grating spectrum, and thereby modulates the optical carrier signal, said outer electrical conductor being formed of a material and having a thickness such that outwardly directed acoustical waves are substantially completely attenuated therein.

\* \* \* \* \*